(12) United States Patent
Mazyar

(10) Patent No.: US 9,169,448 B2
(45) Date of Patent: Oct. 27, 2015

(54) IN-SITU HYDROGENATION OF AROMATIC COMPOUNDS FOR HEAVY OIL UPGRADING

(75) Inventor: Oleg A. Mazyar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 308 days.

(21) Appl. No.: 13/451,030

(22) Filed: Apr. 19, 2012

(65) Prior Publication Data
US 2013/0277273 A1    Oct. 24, 2013

(51) Int. Cl.
| | |
|---|---|
| C10G 45/52 | (2006.01) |
| C10G 49/06 | (2006.01) |
| C10G 49/00 | (2006.01) |
| C10C 3/02 | (2006.01) |
| B01J 23/46 | (2006.01) |
| B01J 27/16 | (2006.01) |
| B01J 35/00 | (2006.01) |

(52) U.S. Cl.
CPC ............... *C10G 45/52* (2013.01); *C10C 3/026* (2013.01); *C10G 49/00* (2013.01); *C10G 49/007* (2013.01); *C10G 49/06* (2013.01); *B01J 23/464* (2013.01); *B01J 27/16* (2013.01); *B01J 35/0013* (2013.01); *C10G 2300/1033* (2013.01); *C10G 2300/1096* (2013.01); *C10G 2300/302* (2013.01); *C10G 2300/308* (2013.01); *C10G 2300/4037* (2013.01); *C10G 2300/42* (2013.01)

(58) Field of Classification Search
CPC ........ C10G 45/44; C10G 45/46; C10G 45/52; C10G 45/56; C10G 49/007; C10G 49/02; C10G 49/06
USPC ............................. 208/44, 142–145; 502/325
See application file for complete search history.

(56) References Cited

U.S. PATENT DOCUMENTS

| | | | | | |
|---|---|---|---|---|---|
| 3,993,601 | A | * | 11/1976 | Long et al. ..................... | 502/303 |
| 4,739,064 | A | * | 4/1988 | Shaw ............................. | 546/102 |
| 4,757,041 | A | * | 7/1988 | Oleck et al. ..................... | 502/65 |
| 4,861,930 | A | | 8/1989 | Cottrell et al. | |
| 5,824,214 | A | | 10/1998 | Paul et al. | |
| 7,517,446 | B2 | * | 4/2009 | Lott et al. ..................... | 208/108 |
| 2005/0239661 | A1 | | 10/2005 | Pfefferle | |
| 2009/0107880 | A1 | | 4/2009 | Chen et al. | |
| 2009/0114568 | A1 | | 5/2009 | Trevino et al. | |
| 2009/0206004 | A1 | * | 8/2009 | McCarthy et al. .............. | 208/57 |
| 2010/0212893 | A1 | | 8/2010 | Moini Araghi et al. | |
| 2010/0228064 | A1 | * | 9/2010 | Leger et al. ..................... | 585/269 |
| 2011/0124496 | A1 | | 5/2011 | Mironov et al. | |

FOREIGN PATENT DOCUMENTS

WO    2010096692 A2    8/2010

OTHER PUBLICATIONS

Amjad Shah et al., "A review of novel techniques for heavy oil and bitumen extraction and upgrading," Energy Environ. Sci., 2010, 3, pp. 700-714.
Christopher P. Nicholas et al., "Synthesis, Spectroscopy, and Catalytic Properties of Cationic Organozirconium Adsorbates on "Super Acidic" Sulfated Alumina. "Single-Site" Heterogeneous Catalysts with Virtually 100% Active Sites," J. Am. Chem. Soc. 2003, 125, pp. 4325-4331.
Ercan Bayram et al., "In Situ Formed "Weakly Ligated/Labile Ligand" Iridium (0) Nanoparticles and Aggregates as Catalysts for the Complete Hydrogenation of Neat Benzene at Romm Temperature and Mild Pressures," Langmuir 2010, 26 (14), pp. 12455-12464.
Henry H. Hwu et al., "Ni/Pt(111) Bimetallic Surfaces: Unique Chemistry at Monolayer Ni Coverage," J. Am. Chem. Soc., vol. 124, No. 4, 2002, pp. 702-709.
Horng-Bin Pan et al., "Sonochemical One-Pot Synthesis of Carbon Nanotube-Supported Rhodium Nanoparticles for Romm-Temperature Hydrogenation of Arenes," J. Phys. Chem. C 2009, 113, pp. 19782-19788.
J.P. Heraud et al., "In Situ Upgrading of Heavy Oil and Bitumen," Alain-Yves, Huc, Editor. "Heavy Crude Oils: From Geology to Upgrading: An Overview," Editions TECHNIP, Paris, France, 2011, Chapter 23, 12p.
J. Reichert et al., "An evaluation of hydroxyapatite-based filters for removal of heavy metal ions from aqueous solutions," Journal of Materials Science 31 (1996), pp. 1231-1241.
J.G. Weissman et al., "Down-Hole Catalytic Upgrading of Heavy Crude Oil," Energy & Fuels 1996, 10, pp. 883-889.
Jeffrey G. Weissman, "Review of processes for downhole catalytic upgrading of heavy crude oil," Fuel Processing Technology 50 (1997), pp. 199-213.
Jun Huang et al., "A novel method to immobilize Ru nanoparticles on SBA-15 firmly by ionic liquid and hydrogenation of arene," Catalysis Letters vol. 103, Nos. 1-2, Sep. 2005 (© 2005), pp. 59-62.
Kenneth S. Suslick, "Sonochemistry," Science, Vol. 247, Mar. 23, 1990, pp. 1439-1445.
Kiyotomi Kaneda et al., "Development of concerto metal catalysts using apatite compounds for green organic syntheses," Energy Environ. Sci., 2009, 2, pp. 655-673.
Martyn Poliakoff et al., "Green Chemistry: Science and Politics of Change," Science, Vol. 297, Aug. 2, 2002, pp. 806-810
Mehmet Zahmakiran et al., "Rhodium (0) Nanoparticles Supported on Nanocrystalline Hydroxyapatite: Highly Effective Catalytic System for the Solvent-Free Hydrogenation of Aromatics at Roon Temperature," Langmuir 2012, 28, pp. 60-64.
Mehmet Zahmakiran et al., "Intrazeolite Ruthenium (0) Nanoclusters: a Superb Catalyst for the Hydrogenation of Benzene and teh Hydrolysis of Sodium Borohydride," Langmuir, vol. 24, No. 14, 2008, pp. 7065-7067.

(Continued)

*Primary Examiner* — Renee E Robinson
(74) *Attorney, Agent, or Firm* — Cantor Colburn LLP

(57) ABSTRACT

A method for upgrading a heavy oil includes: disposing a catalyst comprising rhodium and a support in a heavy oil environment, the heavy oil environment including a heavy oil comprising an aromatic compound; introducing hydrogen; and hydrogenating the aromatic compound with the catalyst and hydrogen to upgrade the heavy oil to upgraded oil. A method for converting an asphaltene includes: disposing a supported catalyst in a composition comprising an asphaltene, the supported catalyst being a low temperature catalyst; introducing hydrogen; and hydrogenating the asphaltene to convert the asphaltene into a hydrogenated asphaltene.

25 Claims, 1 Drawing Sheet

(56) References Cited

OTHER PUBLICATIONS

Mehmet Zahmakiran et al., "Ruthenium (0) nanoclusters supported on hydroxyapatite: highly active, reusable and green catalyst in the hydrogenation of aromatics under mild conditions with an unprecedented catalytic lifetime," Chem. Commun., 2010, 46, pp. 4788-4790.

Mehmet Zahmakiran et al., "Ruthenium (0) Nanoclusters Stabilized by a Nanozeolite Framework: Isolable, Reusable, and Green Catalyst for the Hydrogenation of Neat Aromatics under Mild Conditions with the Unprecedented Catalytic Activity and Lifetime," J. Am. Chem. Soc. 2010, 132, pp. 6541-6549.

Musa B. Abuhesa et al., "Comparison of Conventional and Catalytic in Situ Combustion Processes for Oil Recovery," Energy & Fuels 2009, 23, pp. 186-192.

Nader Mahinpey et al., "In Situ Combustion in Enhanced Oil Recovery (EOR): A Review," Chem. Eng. Comm., 194, 2007, pp. 995-1021.

Richard A. Jones et al., "Synthesis of Polymer-supported Transition Metal Catalysts via Phosphido Linkages: Heterogeneous Catalysts for the Hydrogenation of Aromatic Compounds under Mild Conditions," J. Chem. Soc., Chem. Commun. 1985, pp. 373-374.

S. M. Vargas-Vasquez et al., "The Vapor Extraction Process: Review," Petroleum Science and Technology, 25, 2007, pp. 1447-1463.

S. R. Upreti et al., "Vapor Extraction of Heavy Oil and Bitumen: A Review," Energy & Fuels 2007, 21, pp. 1562-1574.

V S Arutyunov et al., "Pyrolysis of methane in the temperature range 100-1700 K," Russian Chemical Reviews 60 (12) 1991, pp. 1384-1397.

V.P. Simchenko et al., "Oxidation of Natural Gas to Methanol in a Cyclic Mode," Theoretical Foundations of Chemical Engineering, vol. 35, No. 2, 2001, pp. 209-211.

Vincent Mévellec et al., "Surfactant-Stabilized Aqueous Iridium (0) Colloidal Suspension: An Efficient Reuseable Catalyst for Hydrogenation of Arenes in Biphasic Media," Adv. Synth. Catal. 2004, 346, pp. 72-76.

Vladimir Alvarado et al., "Enhanced Oil Recovery: An Update Review," Engergies 2010, 3, pp. 1529-1575, doi: 10.3390/en3091529.

Young-Gil Cho et al., "Kinetic Investigation of Oxidative Methane Pyrolysis at High CH4/O2 Ratio in a Quartz Flow Microreactor below 1073 K," Bull. Korean Chem. Soc. 2008, vol. 29, No. 8, pp. 1609-1612.

Zhibang Duan et al., "Room-Temperature Catalytic Hydrogenation of Aromatic Hydrocarbons Using [(1,5-COD) RhH]4 as a Catalyst Precursor," Chem. Mater. 1992, 4, pp. 1146-1148.

International Preliminary Report on Patentability for related PCT Application No. PCT/US2013/030827, dated Jul. 15, 2013, pp. 1-6.

International Search Report for related PCT Application No. PCT/US2013/030827, dated Jul. 15, 2013, pp. 1-3.

Written Opinion for related PCT Application No. PCT/US2013/030827, dated Jul. 15, 2013, pp. 1-5.

* cited by examiner

IN-SITU HYDROGENATION OF AROMATIC COMPOUNDS FOR HEAVY OIL UPGRADING

BACKGROUND

Heavy oil contains a number of aromatic compounds that cause challenges in producing and refining heavy oil. Toxicity and environmental impact due to some of the aromatic compounds are considerations for heavy oil production and usage. Two prevalent aromatic compounds found in heavy oil are asphaltenes and resins.

Asphaltenes are a major component in crude oil, and there is general agreement as to the deleterious effects of asphaltenes in the reduction of oil extraction and processing in the petrochemical industry. Asphaltenes may deposit in the pores of formations, blocking the flow of fluids. Additionally, asphaltenes can precipitate from a stream of oil and coat boreholes, production tubing, and transport lines. Moreover, in a processing facility, asphaltenes can foul processing equipment and poison catalysts.

Asphaltene molecules have been widely reported as having a fused polyaromatic ring system and containing sulfur, oxygen, and nitrogen heteroatoms. The heteroatoms may be part of the aromatic ring system or part of other carbocyclic rings, linking groups, or functional groups. Two structural motifs for asphaltene molecules are the so-called continental and archipelago structures. In the continental structure, alkyl chains connect to and branch from a central polyaromatic ring system, which is believed to contain several fused aromatic rings, e.g., 10 or more aromatic rings. In the archipelago structure, multiple polyaromatic ring systems are connected by alkyl chains that may contain a heteroatom, and additional alkyl chains extend freely from the polyaromatic rings. The number of fused aromatic rings in the continental structure can be greater than the number of fused aromatic rings in the archipelago structure.

In addition to the aromatic regions of the asphaltenes, heteroatoms provide the asphaltenes with polar regions, and the terminal alkyl chains provide hydrophobic regions. Consequently, it is believed that asphaltene molecules aggregate into various micellular structures in oil, with the alkyl chains interacting with the aliphatic oil components.

Resins are also polyaromatic hydrocarbon species and are smaller structures than asphaltenes. Resins typically have higher solubility in heavy oil than asphaltenes. Additionally, resins in heavy oil can insert between aromatic planes of neighboring asphaltene molecules in asphaltene aggregates, aiding in maintaining the micellular structure of asphaltene aggregates. Asphaltenes can precipitate from oil in structures such as where asphaltene molecules form stacked layers having aligned aromatic regions and aligned aliphatic regions. Asphaltene aggregates suspended in oil can deposit in pores of a formation and along walls of a borehole, casing, and production and transportation tubing, decreasing flow rate or stopping production of oil.

Materials and methods for upgrading heavy oil by converting aromatic compounds therein would be well received in the art.

BRIEF DESCRIPTION

The above and other deficiencies of the prior art are overcome by, in an embodiment, a method for upgrading a heavy oil, the method comprising: disposing a catalyst comprising rhodium and a support in a heavy oil environment, the heavy oil environment including a heavy oil comprising an aromatic compound; introducing hydrogen; and hydrogenating the aromatic compound with the catalyst and hydrogen to upgrade the heavy oil to upgraded oil.

In another embodiment, a method for converting an asphaltene comprises: disposing a supported catalyst in a composition comprising an asphaltene, the supported catalyst being a low temperature catalyst; introducing hydrogen; and hydrogenating the asphaltene to convert the asphaltene into a hydrogenated asphaltene.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
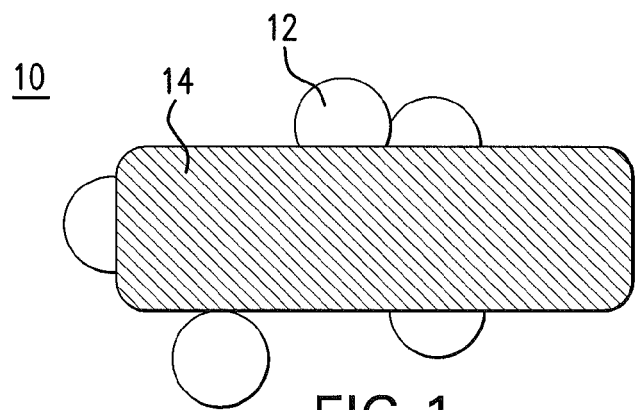
FIG. 1 shows a catalyst.

A detailed description of one or more embodiments of the disclosed material and method are presented herein by way of exemplification and not limitation with reference to the Figures.

It has been found that hydrogenating aromatic compounds found in heavy oil can be used to upgrade heavy oil. Moreover, in-situ hydrogenation of asphaltenes in heavy oil reduces the attractive forces between polyaromatic hydrocarbon cores of the asphaltene molecules. It has also been found that hydrogenated asphaltenes have lower incidence of forming aggregates or precipitating from suspension. Consequently, hydrogenation of such aromatic compounds reduces the viscosity of heavy oil, prevents plugging of reservoirs or production equipment and hardware with asphaltene particles, and decreases the toxicity of the upgraded oil compared to the heavy oil.

An asphaltene particle includes any collection of asphaltene molecules, for example, a micelle, precipitate, layered asphaltene molecules, aggregate, cluster, and the like. Interactions among the asphaltene molecules in an asphaltene particle may include hydrogen bonding, dipole-dipole interactions, and $\pi$-$\pi$ interactions. Without wishing to be bound by theory, disruption of these interactions can lead to exfoliation of an asphaltene molecule from the asphaltene particle. The methods herein are applicable to downhole as well as to ground environments.

In an embodiment, a method for upgrading heavy oil includes disposing a catalyst in a heavy oil environment, which includes an aromatic compound; introducing hydrogen into the heavy oil environment; and hydrogenating the aromatic compound with the catalyst and hydrogen to upgrade the heavy oil to upgraded oil.

Hydrogenation of the aromatic compound in the heavy oil is carried out in the presence of hydrogen and the catalyst. The catalyst can be a hydrogenation catalyst such as a metal. Further, the catalyst can be a supported catalyst such as a metal disposed on a support. Exemplary metals include elements from Group IB, Group IVB, Group VB, Group VIB, Group VIIB, or Group VIII of the periodic table, including but not limited to, chromium, iron, manganese, molybdenum, tungsten, vanadium, silver, gold, nickel, palladium, platinum, rhodium, ruthenium, a compound thereof, an alloy thereof, or a combination thereof. In a particular embodiment, the metal is palladium, platinum, rhodium, ruthenium, or a combination thereof. Further, the metal can be in any suitable form such as powder, dust, particle, and the like. In an embodiment, the metal is a nanoparticle. In a further embodiment, the metal is charge neutral in the active catalyst. As used herein, "active catalyst" refers to a catalyst that has an activity effective to hydrogenate aromatic compounds found in heavy oil.

The metal can be part of a compound. Exemplary metal compounds include metal halides and their hydrates, metal inorganic acid salts, metal organic acid salts, metal complexes, and the like. In a non-limiting embodiment, compounds of rhodium include halides such as rhodium chloride, rhodium bromide, rhodium iodide, and hydrates thereof (e.g., rhodium trichloride trihydrate); inorganic acid salts such as rhodium nitrate and rhodium sulfate; organic acid salts such as rhodium acetate, rhodium formate, rhodium propionate, rhodium butyrate, rhodium valerate, and rhodium naphthenate; rhodium oxide, rhodium trihydroxide; and complex compounds such as dichloro-bis(triphenylphosphine) rhodium, trichlorotris-pyridinerhodium, tetrarhodium dodecacarbonyl, dirhodium octacarbonyl, hexarhodium hexadecarbonyl, rhodium dicarbonylacetylacetonate, rhodium carbonyl(1-phenylbutane-1,3-dion), tris(hexane-1-2,4-dion)rhodium, tris(heptane-2,4-dion)rhodium, tris(1-phenylbutane-1,3-dion)rhodium, tris(3-methylpentane-1-2,4-dion)rhodium, and tris(1-cyclohexylbutane-1,3-dion)rhodium; and the like. Combinations of these compounds can be used together as long as the catalyst remains an active catalyst.

The catalyst can be a homogeneous catalyst such as a metal without a support. In an exemplary embodiment, the catalyst is a heterogeneous catalyst such as a supported catalyst, which includes a metal disposed on and supported on a support. Exemplary supports include activated carbon, activated clay, alumina gel, diatomaceous earth, minerals, silica gel, or zeolites. Minerals include, for example, those from a silicate mineral class, carbonate mineral class, sulfate mineral class, halide mineral class, oxide mineral class, sulfide mineral class, phosphate mineral class, organic mineral class, and the like. In one embodiment, the support includes a mineral from the phosphate mineral class such as a phosphate, arsenate, vanadate, or antimonate mineral. In a particular embodiment, the mineral is a phosphate mineral, more particularly apatite, and even more particularly bromapatite, chlorapatite, fluorapatite, hydroxyapatite, or a combination comprising at least one of the foregoing. In another embodiment, the support includes a zeolite. The zeolite can be a naturally occurring or synthetic zeolite. Exemplary zeolites include faujasite, montesommaite, mordenite, stellerite, stilbite, Zeolite A, Zeolite X, Zeolite Y, and Zeolite ZSM-5.

According to an embodiment, the catalyst is a metal on a support such that the amount of the metal is from 0.05 weight percent (wt %) to 80 wt %, specifically 0.5 wt % to 50 wt %, and more specifically 1 wt % to 30 wt % by weight, based on the combined weight of the metal and support. In an exemplary embodiment, the metal is a nanoparticle with a size of 0.5 nanometers (nm) to 200 nm, specifically 0.5 nm to 150 nm, and more specifically 0.5 nm to 60 nm. As used here, the size of a nanoparticle refers to the greatest linear dimension of the nanoparticle. The nanoparticle can be any shape, including round, polygonal, tubular, irregular, and the like. The aspect ratio of the nanoparticle can be 1:1 to 1:1000, specifically 1:1 to 1:100, and more specifically 1:1 to 1:5.

The support on which the metal has been supported can be molded into an appropriate shape such as, for example, spherical, columnar, polyhedral and honeycomb shapes. The shape can vary depending upon the particular application environment or hydrogenation conditions. The support can have an aspect ratio of 1:1 to 1:1000, specifically 1:1 to 1:100, and more specifically 1:1 to 1:5. Additionally, the support can have dimensions that are nanocrystalline or microcrystalline. That is, the support can be nano-sized along one dimension and micro-sized in a separate dimension. Thus, the support can have a size from 50 micrometers (μm) to 10 nm, specifically 10 μm to 10 nm, and more specifically 1 μm to 10 nm. In an embodiment, each dimension of the support is less than 500 nm, specifically less than 200 nm, and more specifically less than 100 nm. In an embodiment, the support is less than 100 nm with metal nanoparticles disposed thereon that are stabilized via interaction with the support, and the catalyst exhibits enhanced activity due to this size. For the less than 100 nm-sized support, it is believed that enhanced catalytic activity is due to the amount of surface area of the support, the number of exchange sites, and increased mass-transfer as compared with larger sized supports.

The metal can be disposed and supported on the support by any method effective to cause disposal of the metal on the support such as, for example, a dipping method, a coating method, a spraying method, an adsorption method, a precipitation method, and the like. The catalyst can be prepared from commercially available compounds. In a specific embodiment, a catalyst containing rhodium nanoparticles disposed on a hydroxyapatite support can be prepared by a method as described in M. Zahmakiran et al., *Langmuir* 28, 60 (2012), the content of which is incorporated herein by reference in its entirety. Thus, in a non-limiting embodiment, the catalyst is a rhodium nanoparticle (being, for example, charge neutral) disposed on a hydroxyapatite support. Further, the rhodium nanoparticles can be disposed on the hydroxyapatite support via ion exchange of $Ca^{2+}$ of the hydroxyapatite support with $Rh^{3+}$ from a rhodium salt compound such as rhodium trichloride trihydrate with subsequent reduction of $Rh^{3+}$ disposed on the hydroxyapatite to Rh(0) nanoparticles. The hydroxyapatite support can be less than 100 nm. It is contemplated that other supports can be used to support the catalyst. In a particular embodiment, a ruthenium catalyst is supported on a zeolite, specifically a ruthenium(0) nanocluster is supported on a nanozeolite.

FIG. 1 depicts a cross-section of a supported catalyst. The catalyst 10 has metal nanoparticles 12 supported on a support 14.

The catalysts herein are low temperature catalysts, which have an activity effective to hydrogenate aromatic compounds in heavy oil over a broad temperature range or broad pressure range. In an embodiment, the supported catalyst is a low temperature catalyst having an activity effective to hydrogenate the aromatic compound, e.g., asphaltene, at a temperature of 20° C. to 500° C., specifically 20° C. to 300° C., and more specifically 20° C. to 150° C. Moreover, the supported catalyst effectively catalyzes hydrogenation of aromatic compounds at low pressures of hydrogen. The hydrogen pressure can be 3 atmosphere (atm) to 40 atm, specifically 3 atm to 25 atm, and more specifically 3 atm to 5 atm. The catalyst, particularly the supported catalyst herein, can catalyze hydrogenation at low temperatures and at a low pressure of hydrogen. In addition, the catalyst can catalyze hydrogenation of the aromatic compound at a total pressure from 3 atm to 250 atm, specifically 3 atm to 175 atm, and more specifically 3 atm to 50 atm.

According to an embodiment, the catalyst is dispersed in a fluid prior to disposing the catalyst in the heavy oil environment. The fluid aids dispersal of the catalyst in the heavy oil. Thus, a fluid can be selected that has appreciable miscibility with heavy oil. The fluid can be gas, liquid, or solid. Exemplary fluids include propane, butane, pentane, dimethyl sulfoxide, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, dimethylformamide, hexamethylphosphoramide, nitromethane, or a combination comprising at least one of the foregoing. The catalyst can be combined with the fluid in various ways such as mechanically blending or mixing the fluid and the catalyst.

In yet another embodiment, a catalyst promoter can be disposed in the heavy oil environment. The catalyst promoter and catalyst can be disposed simultaneously or at different times. As used herein, "promoter" refers to a material that can act as a co-catalyst (to enhance hydrogenation rate as compared to use of only the catalyst), increase the activity of the catalyst (e.g., the supported catalyst herein), preserve the activity of the catalyst, aid dispersion of the catalyst, or bind to reagents (e.g., constituents of the heavy oil). For example, the promoter can prevent production of contaminants on the surface of the catalyst or remove such material. The catalyst promoter can be a metal, surfactant, or a combination comprising at least one of the foregoing. Exemplary catalyst promoters include metals such as cobalt, chromium, iron, manganese, molybdenum, nickel, tungsten, titanium, vanadium, or a combination comprising at least one foregoing.

In an embodiment, the catalyst promoter is the surfactant. Exemplary anionic surfactants include alkyl sulfates, alkyl sulfonates, alkyl benzene sulfates, alkyl benzene sulfonates, fatty acids, sulfosuccinates, and phosphates. Exemplary cationic surfactants include but are not limited to alkyl primary, secondary, and tertiary amines, alkanolamides, quaternary ammonium salts, alkylated imidazolium, and pyridinium salts. Examples of nonionic surfactants include ethoxylated fatty alcohols, alkyl phenol polyethoxylates, fatty acid esters, glycerol esters, glycol esters, polyethers, alkyl polyglycosides, and amineoxides. Zwitterionic surfactants (which include a cationic and anionic functional group on the same molecule) include, for example, betaines, such as alkyl ammonium carboxylates (e.g., [(CH$_3$)$_3$N$^+$—CH(R)COO$^-$] or sulfonates (sulfo-betaines) such as [RN$^+$(CH$_3$)$_2$(CH$_2$)$_3$SO$_3^-$], where R is an alkyl group). Examples include n-dodecyl-N-benzyl-N-methylglycine [C$_{12}$H$_{25}$N$^+$(CH$_2$C$_6$H$_5$)(CH$_3$)CH$_2$COO$^-$], N-allyl N-benzyl N-methyl-taurines [C$_n$H$_{2n+1}$N$^+$(CH$_2$C$_6$H$_5$)(CH$_3$)CH$_2$CH$_2$SO$_3^-$]. Without being bound by theory, the surfactant can remove material adsorbed, physisorbed, or precipitated on the catalyst. As an example, asphaltenes contain heteroatoms that coordinate vanadium and nickel. The metals can precipitate onto the catalyst from the asphaltene and can thereafter be removed from the catalyst by the surfactant.

The catalyst promoter can be present in an amount from about 0.05 wt % to about 150 wt %, specifically about 0.1 wt % to about 90 wt %, and more specifically about 1 wt % to about 10 wt %, based on the weight of the catalyst.

The aromatic compound in the heavy oil is fully hydrogenated or partially hydrogenated by the catalyst. Hydrogenation occurs for compounds across double bonds. As such, compounds having a single double bond or more than one double bond can be hydrogenated by the catalyst herein. Various types of multiple bonds can be hydrogenated including alkene, alkyne, aldehyde, ketone, ester, imine, amide, nitrile, nitro, and the like. These bond types can be found in the aromatic compounds in heavy oil such as asphaltenes and resins.

According to an embodiment, the aromatic compound includes an asphaltene, resin, or a combination comprising at least one of the foregoing. In one embodiment, the aromatic compound is asphaltene, and the asphaltene is hydrogenated such that the heavy oil is converted to upgraded oil that comprises the hydrogenated asphaltene. Without being bound by theory, hydrogenation of an asphaltene involves decreasing the degree of aromaticity in the asphaltene by breaking a π bond in the asphaltene. Due to the decrease in the degree of aromaticity in the asphaltene, the hydrogenated asphaltene will exhibit a higher miscibility in heavy oil and upgraded oil than the original, non-hydrogenated asphaltene. Moreover, in the instance where an ensemble of asphaltene molecules aggregate to form an asphaltene particle comprising asphaltene molecules, the asphaltene molecules are held together by π-π interactions afforded by overlapping π electrons of the polyaromatic systems within the constituent asphaltene molecules. Hydrogenation of a constituent asphaltene molecule of the asphaltene particle decreases the stabilizing energy of the π-π interactions of the formerly non-hydrogenated asphaltene molecule with the other asphaltene molecules of the asphaltene particle. Thus, the hydrogenated asphaltene molecule can be less tightly bound to the asphaltene particle. As such, the hydrogenated asphaltene molecule can have an increased separation (i.e., intermolecular distance) from the asphaltene particle as compared to the intermolecular distance before hydrogenation. Since the hydrogenated asphaltene can also have a greater miscibility with the heavy oil and upgraded oil, the hydrogenated asphaltene can become separated from the asphaltene particles. Consequently, by hydrogenating aromatic species in heavy oil, asphaltene particles can be exfoliated. Therefore, in an embodiment, a method of upgrading oil includes exfoliating particles comprising the aromatic compound in response to hydrogenating the aromatic compound.

Figure 2A:
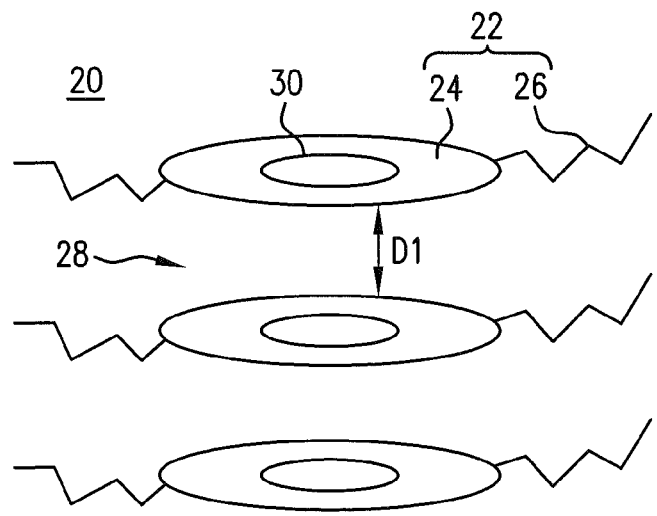
FIG. 2A shows an asphaltene particle having asphaltene molecules.
Figure 2B:
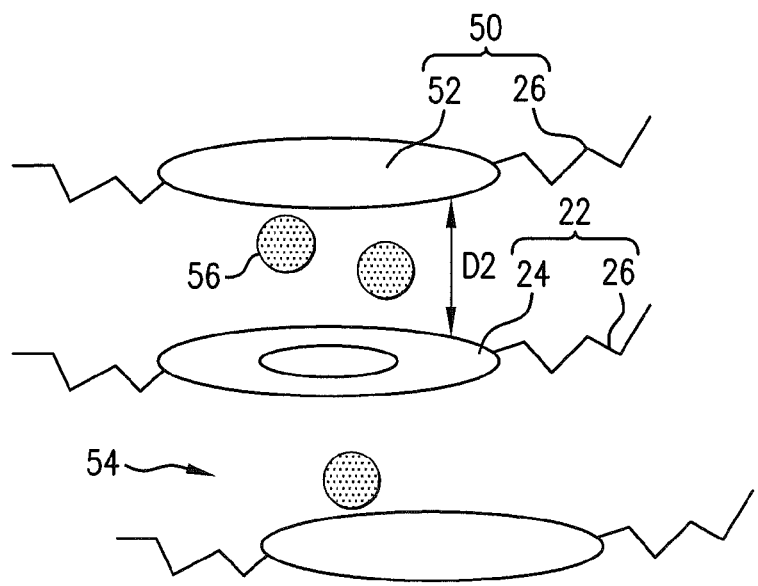
FIG. 2B shows exfoliation of an asphaltene particle.

As shown in FIGS. 2A and 2B, an asphaltene particle 20 includes asphaltene molecules 22 with a gallery 28 separating adjacent asphaltene molecules 22 by a distance of D1. The asphaltene molecule 22 has a polyaromatic region 24 (indicated by ring 30) with a generally aliphatic tail 26. As previously discussed, the asphaltene molecule 22 can have contiguous or separated aromatic regions and heteroatoms. Thus, ring 30 indicates any region of aromaticity within asphaltene 22. Upon hydrogenation, some of the asphaltene molecules 22 in the asphaltene particle 20 can be converted to hydrogenated asphaltene 50 (FIG. 2B) having a hydrogenated region 52 that is hydrogenated and more saturated than polyaromatic region 30 of the non-hydrogenated asphaltene molecule 22. For simplicity, we denote hydrogenation, by absence of the ring 30 from the hydrogenated asphaltene. In addition, the hydrogenated can be completely or partially hydrogenated. It is contemplated that hydrogenation of polyaromatic region 30 to hydrogenated region 52 can cause bond scission such that atoms within the polyaromatic region may become unbound to one another, e.g., lysing of carbon-heteroatom bonds (such as carbon-sulfur bond cleavage) and including ring-opening reactions. In addition, the generally aliphatic tail 26 also can be hydrogenated if it has regions of unsaturation, e.g., olefin bonds. Upon hydrogenation, distance D1 increases to distance D2 in the gallery 54 between the hydrogenated asphaltene 50 and asphaltene molecule 22. In addition, other substituents (e.g., resin or lighter oil molecules or solvent) 56 from the environment surrounding the asphaltene particle 22 can interpose between the hydrogenated asphaltene 50 and asphaltene molecule 22. Consequently, the asphaltene particle can exfoliate as distance D2 becomes sufficiently large enough such that the interaction between the asphaltene molecules 22 and the hydrogenated asphaltene 50 is weak compared to interactions of either component (asphaltene molecules 22 or the hydrogenated asphaltene 50) with other substituents 56, including the bulk oil. Moreover, the conditions (temperature, pressure, pH, etc.) can shift the association-disassociation equilibrium to favor exfoliation of the hydrogenated asphaltene 50 from the asphaltene particle 20.

In an embodiment, the heavy oil environment includes a downhole environment, borehole, wellbore, refinery, pre-refinery facility, production zone, formation, reservoir, production tubing, casing, or a combination comprising at least one of the foregoing. The pre-refinery facility can include items such as transportation tubing, processing equipment, storage facilities, and the like.

In an embodiment, the heavy oil is converted to upgraded oil via hydrogenation of aromatic compounds in the heavy oil, and the upgraded oil is produced. In one embodiment, hydrogenating the aromatic compound occurs prior to producing the upgraded oil. Alternatively, hydrogenating the aromatic compound occurs subsequent to producing the heavy oil. Prior to disposition of the catalyst in the heavy oil environment, care is taken so that the catalyst is not spent before hydrogenation occurs, e.g., as the catalyst is run downhole. As such, contact of the catalyst with compounds or particles having carbon double bonds (e.g., aromatic or olefinic compounds) is minimized.

The catalyst can be disposed in the heavy oil environment in various ways. In an embodiment, disposing the catalyst includes disposing the catalyst in a downhole element such as on gravel particles in gravel pack, proppant, filter, sand screen, or fluid. According to an embodiment, the fluid can entrain the catalyst to deliver the catalyst to the heavy oil environment via, e.g., injection. In another embodiment, the catalyst is disposed on a resin that coats gravel in a gravel pack and cures in the heavy oil environment to form a sand consolidation and filtration element having exposed catalyst to catalyze hydrogenation of aromatic compounds that contact the gravel pack. In yet another embodiment, the catalyst is physisorbed or chemically bound to the surfaces of gravel in a gravel pack. In yet another embodiment, the catalyst is physisorbed or chemically bound to proppant or resin-coated proppant, which holds the fractures open after a hydraulic fracturing treatment.

According to an embodiment, a method for converting an aromatic compound (e.g., an asphaltene, resin, etc.) includes disposing a supported catalyst in a composition comprising the aromatic compound, the supported catalyst being a low temperature catalyst; introducing hydrogen; and hydrogenating the aromatic compound to convert the aromatic compound into a hydrogenated compound. In a particular embodiment, the aromatic compound is an asphaltene. It is contemplated that the supported catalyst is a low temperature catalyst having an activity effective to hydrogenate the asphaltene at a temperature of less than or equal to 25° C., specifically less than or equal to 27° C., and more specifically less than or equal to 30° C. In a particular embodiment, the supported catalyst includes rhodium and a support such as hydroxyapatite. The catalyst can include metal nanoparticles (e.g., rhodium nanoparticles) supported on a nanocrystalline hydroxyapatite matrix.

The hydrogen can be introduced by injecting hydrogen gas via a vertical or horizontal well, generating hydrogen in-situ, or a combination comprising at least one of the foregoing. Generating hydrogen in-situ can be in-situ combustion of a hydrocarbon followed by an oxidative hydrocarbon pyrolysis and a pyrolysis of hydrocarbons. Such in-situ hydrogen generation includes pyrolysis of a hydrocarbon by heating the hydrocarbon using, for example, electric resistive heating, induction heating, or a combination comprising at least one of the foregoing. In a specific embodiment, the hydrocarbon present in a downhole formation, can be ignited using injected air or another oxygen source (including pure oxygen, steam, and the like) to produce hydrogen in a heavy oil environment. According to an embodiment, the method includes increasing the temperature to cause reaction to ensue. Increasing the temperature includes techniques that can elevate the temperature to about 400° C. to about 1200° C., specifically about 400° C. to about 1000° C., and more specifically about 400° C. to about 800° C. Such techniques involve, for example, in-situ combustion, steam introduction, heated fluid injection, electric resistive heating, induction heating, or a combination comprising at least one of the foregoing. In an embodiment, a heavy oil environment is heated by introducing steam in an injection well with the steam propagating through the formation.

Heated fluid injection can include heating a fluid (e.g., a solvent) and subsequently disposing the heated fluid downhole to increase the temperature of the heavy oil environment to produce hydrogen. In a non-limiting embodiment, in-situ combustion increases the temperature of the heavy oil environment by injecting a gas containing oxygen, for example air, downhole and igniting oil in the reservoir with concurrent combustion with the gas. The combustion releases heat, which can be absorbed by components in the heavy oil.

In certain embodiments, generating hydrogen in-situ can be accomplished using sonic energy. The sonic frequencies can be from about 400 hertz (Hz) to about 400 megahertz (MHz), specifically about 800 Hz to about 350 MHz, and more specifically about 1 kilohertz (kHz) to about 300 MHz. A transducer placed near the hydrogen source can produce the sonic frequency, which can interact with source of the hydrogen. Sonic frequencies can, thus, induce chemical reactions. Without wishing to be bound by any particular theory, such reactivity can be induced by short-lived, localized disturbances (e.g., a hot spot) produced by the implosion of bubbles in the course of acoustic cavitation. An exemplary embodiment of using sonic energy to generate hydrogen in-situ includes subjecting downhole hydrocarbons and water and the combination thereof to a sonic frequency. Alternatively, the sonic energy can be used to subject a metal hydride or a nitrogen composition to a sonic frequency. An exemplary nitrogen composition includes an amine (e.g., a primary amine, secondary amine, and the like), ammonia, a hydrazine (e.g., hydrazine, a substituted hydrazine such methylhydrazine, and the like), pyridine and its derivatives, imidazole and its derivatives, $LiNH_2$, $NaNH_2$, or a combination comprising at least one of the foregoing. Exemplary metal hydrides include $NaAlH_4$, $LiAlH_4$, $Li_3AlH_6$, $LiNa_2AlH_6$, $Ca(AlH_4)_2$, $MgH_2$ $LiBH_4$, $NaBH_4$, $Ca(BH_4)_2$, $Mg(BH_4)_2$, $LiAlH_4$, $NaAlH_4$, $Ca(AlH_4)_2$, or a combination comprising at least one of the foregoing. In a further embodiment, the metal hydride, nitrogen composition, or combination thereof can be subjected to pyrolysis. Such pyrolysis can occur after heating a formation or region by in-situ combustion.

In another embodiment, generating hydrogen in-situ comprises reacting a metal with a fluid. The metal can be a metal that reacts with the fluid to produce hydrogen gas such as aluminum, iron, magnesium, zinc, or a combination comprising at least one of the foregoing. The fluid can be a brine, mineral acid (e.g., hydrochloric acid, sulfuric acid, and the like) or a combination thereof. In an embodiment, the metal is a metal particle that includes magnesium and iron, and the fluid is brine. The rate of hydrogen generation is contemplated to vary by addition of the metal or the fluid. Thus, the amount of hydrogen can be limited to a total amount given by a limiting reagent or the amount can be modulated by temporally introducing certain amounts of the metal or fluid at selected times.

The upgraded oil produced by hydrogenating the aromatic compound in the heavy oil has beneficial properties compared with the heavy oil from which it is derived. In addition to hydrogenating heavy molecular weight polyaromatic compounds (e.g., asphaltenes, resins, and the like), and olefins, and the like), hydrogenation of lower molecular weight aromatic and olefinic compounds occurs in a heavy oil environment. In an exemplary embodiment, due to hydrogenation of lower molecular weight aromatics, the upgraded oil has a lower amount of components of crude oil including volatile aromatic compounds (e.g., benzene, toluene, ethylbenzene, xylenes, and the like), fused polyaromatic rings compounds (e.g., naphthalene, anthracene, chrysene, fluorene, and the like), and the like.

In another embodiment, the upgraded oil has a greater API (American Petroleum Institute) gravity than that of the heavy oil. In a specific embodiment, the API gravity of the upgraded oil is greater than that of the heavy oil by at least 10 degrees, specifically at least 7 degrees, and more specifically at least 5 degrees. According to an embodiment, the viscosity of the upgraded oil is less than that of the heavy oil. In a particular embodiment, the viscosity of the upgraded oil is less than that of the heavy oil by at least 99%, specifically at least 95% and more specifically at least 90%, based on the viscosity of the heavy oil.

Thus, the methods herein can be used to decrease heavy oil viscosity in a reservoir, borehole, processing facility, and the like. Hydrogenation of heavy oil, for example by hydrogenating aromatic compounds therein, can be used to upgrade the oil. In an embodiment, asphaltene particles that constrict flow in, for example, a tubular, can be hydrogenated to restore flow in a plugged pipeline. Additionally, hydrogenation of heavy oil aromatics can increase permeability in porous media and flow channels. Because of the hydrogenation, the number of asphaltene molecules in an asphaltene particles is decreased such that the oil viscosity also decreases. Lowering the viscosity of the oil improves production efficiency. Additionally, the detrimental effects of asphaltenes, resins, and other heavy oil aromatics can be diminished or eliminated, including alleviation of flocculates of asphaltenes that can plug a reservoir or production tubing, restrict flow in a transport line, foul a production facility, alter wettability of crude oil, or poison a refinery catalyst.

The methods herein are further illustrated by the following non-limiting example.

EXAMPLE

Crude oil including asphaltene particles is saturated with hydrogen and placed in a vessel containing a rhodium supported on nanocrystalline hydroxyapatite catalyst. The vessel is pressurized with 3 bars of $H_2$. While stirring the contents of the vessel, the temperature is maintained at 25° C. The reaction is allowed to proceed for 5 hours to produce upgraded oil. The viscosity of the upgraded oil is less than the crude oil, and the API gravity of the upgraded oil is greater than the crude oil. In addition, the particle size distribution of fresh crude oil and aliquots from the vessel are determined using dynamic light scattering. The peak in the particle size distribution for upgraded oil shifts to lower values as compared to that of untreated crude oil.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive, rather the elements can be used separately or can be combined together under appropriate circumstances.

What is claimed is:

1. A method for upgrading a heavy oil, the method comprising:
    disposing a catalyst comprising rhodium and a support in a heavy oil environment, the heavy oil environment including a heavy oil comprising an aromatic compound;
    introducing hydrogen; and
    hydrogenating the aromatic compound with the catalyst and hydrogen to upgrade the heavy oil to provide an upgraded oil;
    wherein the rhodium comprises rhodium nanoparticles supported on the support;
    and wherein the support comprises hydroxyapatite, fluoroapatite, chloroapatite, bromoapatite, or a combination comprising at least one of the foregoing,
    wherein the aromatic compound is asphaltene; and
    wherein the method further comprises adjusting a temperature, pressure, and pH of the heavy oil environment to exfoliate particles of the aromatic compound in response to hydrogenating the aromatic compound.

2. The method of claim 1, wherein the catalyst is rhodium nanoparticles supported on nanocrystalline hydroxyapatite.

3. The method claim 1, wherein the catalyst is dispersed in a fluid prior to disposing the catalyst in the heavy oil environment.

4. The method of claim 3, wherein the fluid comprises propane, butane, pentane, dimethyl sulfoxide, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, dimethylformamide, hexamethylphosphoramide, nitromethane, or a combination comprising at least one of the foregoing.

5. The method of claim 1, wherein disposing the catalyst further comprises disposing the catalyst on gravel particles in gravel pack, proppant, filter, sand screen, fluid, or a combination comprising at least one of the foregoing.

6. The method of claim 1, further comprising disposing, in the heavy oil environment, a catalyst promoter which includes a metal, surfactant, or a combination comprising at least one of the foregoing.

7. The method of claim 1, wherein the upgraded oil comprises hydrogenated asphaltene.

8. The method of claim 1, wherein the heavy oil environment comprises downhole, a refinery, pre-refinery facility, production zone, formation, reservoir, or a combination comprising at least one of the foregoing.

9. The method of claim 8, further comprising producing the upgraded oil, wherein hydrogenating occurs prior to producing the upgraded oil.

10. The method of claim 8, further comprising producing the heavy oil, wherein hydrogenating occurs subsequent to producing the heavy oil.

11. The method of claim 1, wherein hydrogenating the aromatic compound is at a temperature from 20° C. to 1500° C.

12. The method of claim 1, wherein the pressure of hydrogen is from 3 atm to 40 atm.

13. The method of claim 1, wherein hydrogenating the aromatic compound is at a total pressure from 3 atm to 250 atm.

14. The method of claim 1, wherein the upgraded oil has a greater API gravity than that of the heavy oil.

15. The method of claim 1, wherein the API gravity of the upgraded oil is greater than that of the heavy oil by at least three degrees.

16. The method of claim 1, wherein the viscosity of the upgraded oil is less than that of the heavy oil.

17. A method for converting an asphaltene, the method comprising:
   disposing a supported catalyst in a composition comprising an asphaltene, the supported catalyst being a low temperature catalyst;
   introducing hydrogen; and
   hydrogenating the asphaltene to convert the asphaltene into a hydrogenated asphaltene, wherein the supported catalyst comprises rhodium nanoparticles supported on a support; and wherein the support comprises hydroxyapatite, fluoroapatite, chloroapatite, bromoapatite, zeolite, or a combination comprising at least one of the foregoing;
   wherein introducing hydrogen comprises generating hydrogen in-situ, or a combination comprising generating hydrogen in-situ and injection hydrogen gas;
   wherein generating hydrogen in-situ comprises subjecting a target to sonic energy, pyrolysis, or a combination comprising at least one of the foregoing; and
   wherein the target comprises a metal hydride comprising one or more of the following: $NaAlH_4$; $LiAlH_4$; $Li_3AlH_6$; $LiNa_2AlH_6$; $Ca(AlH_4)_2$; $MgH_2$ $LiBH_4$; $NaBH_4$; $Ca(BH_4)_2$; or $Mg(BH_4)_2$.

18. A method for converting an asphaltene, the method comprising:
   disposing a catalyst in a composition comprising an asphaltene;
   introducing hydrogen; and
   hydrogenating the asphaltene to convert the asphaltene into a hydrogenated asphaltene,
   wherein introducing hydrogen comprises generating hydrogen in-situ; and
   wherein generating hydrogen in-situ comprises:
   in-situ combustion of a hydrocarbon; or
   pyrolysis of a hydrocarbon by heating the hydrocarbon using electric resistive heating, induction heating, or a combination comprising at least one of the foregoing; or
   reacting a metal with a fluid.

19. The method of claim 18, wherein the catalyst is a supported low temperature catalyst having an activity effective to hydrogenate the asphaltene at a temperature of 25° C.

20. The method of claim 18, wherein generating hydrogen in-situ comprises in-situ combustion of a hydrocarbon.

21. The method of claim 18, wherein generating hydrogen in-situ comprises pyrolysis of a hydrocarbon by heating the hydrocarbon using electric resistive heating, induction heating, or a combination comprising at least one of the foregoing.

22. The method of claim 18, wherein generating hydrogen in-situ comprises reacting a metal with a fluid.

23. The method of claim 22, wherein the metal is aluminum, iron, magnesium, zinc, or a combination comprising at least one of the foregoing.

24. The method of claim 22, wherein the fluid is brine, acid, or a combination comprising at least one of the foregoing.

25. The method of claim 18, wherein the catalyst is a supported catalyst comprising rhodium nanoparticles supported on a support comprising hydroxyapatite, fluoroapatite, chloroapatite, bromoapatite, zeolite, or a combination comprising at least one of the foregoing.

* * * * *